(12) United States Patent
Dahm et al.

(10) Patent No.: US 12,415,495 B2
(45) Date of Patent: Sep. 16, 2025

(54) METHOD FOR DETECTING A BRAKE PEDAL ACTUATION OF A BRAKE PEDAL BY A DRIVER DURING AN INITIALISATION OF AN ACTUATOR AND METHOD FOR INITIALISING AN ACTUATOR OF A BRAKE SYSTEM

(71) Applicant: ZF Active Safety GmbH, Koblenz (DE)

(72) Inventors: Andreas Dahm, Koblenz (DE); Michael Friedrich, Elz (DE)

(73) Assignee: ZF Active Safety GmbH, Koblenz (DE)

( * ) Notice: Subject to any disclaimer, the term of this patent is extended or adjusted under 35 U.S.C. 154(b) by 387 days.

(21) Appl. No.: 17/974,222

(22) Filed: Oct. 26, 2022

(65) Prior Publication Data
US 2023/0127493 A1 Apr. 27, 2023

(30) Foreign Application Priority Data
Oct. 27, 2021 (DE) .......................... 102021128011.7

(51) Int. Cl.
*B60T 17/22* (2006.01)
*B60T 7/04* (2006.01)
*G07C 5/08* (2006.01)

(52) U.S. Cl.
CPC .............. *B60T 17/22* (2013.01); *B60T 7/042* (2013.01); *G07C 5/085* (2013.01)

(58) Field of Classification Search
CPC ........ B60T 17/22; B60T 7/042; B60T 13/662; B60T 13/745; G07C 5/085

USPC ......................................................... 701/33.1
See application file for complete search history.

(56) References Cited

U.S. PATENT DOCUMENTS

| | | | |
|---|---|---|---|
| 6,215,394 B1 * | 4/2001 | Sellin ...................... | B60T 17/22 188/1.11 R |
| 6,393,345 B1 * | 5/2002 | Kerns .................... | B60T 17/221 123/505 |
| 6,405,117 B1 | 6/2002 | Walenty et al. | |
| 9,403,516 B2 * | 8/2016 | Strengert .................. | B60T 1/10 |
| 2003/0048182 A1 * | 3/2003 | Fulks ...................... | B60T 7/042 340/665 |
| 2004/0162652 A1 * | 8/2004 | Kems .................... | F02D 41/222 701/30.7 |
| 2006/0097569 A1 * | 5/2006 | Eberling ................... | B60T 8/88 303/9.66 |
| 2009/0072615 A1 * | 3/2009 | Oosawa ................ | B60T 8/4072 701/79 |

(Continued)

FOREIGN PATENT DOCUMENTS

DE 102004048605 B3 4/2006

*Primary Examiner* — Tuan C To
*Assistant Examiner* — Dominick Mulder
(74) *Attorney, Agent, or Firm* — Kristin L. Murphy

(57) ABSTRACT

A method for detecting a brake pedal actuation of a brake pedal by a driver during an initialization of an actuator, of a brake system, in which, during operation, an initialization operation and/or a system initialisation, of the actuator, a dynamic, position analysis of a pedal position and/or of a pedal travel of the brake pedal and/or of an input piston, which is coupled and/or couplable to the brake pedal, takes place, and method for initialising an actuator, a computer program product, control unit or system comprising a plurality of control units and a corresponding device.

13 Claims, 1 Drawing Sheet

(56) References Cited

U.S. PATENT DOCUMENTS

| | | | |
|---|---|---|---|
| 2011/0024249 A1* | 2/2011 | Nishikawa | B60T 8/261 |
| | | | 701/70 |
| 2011/0254358 A1* | 10/2011 | Strengert | B60T 13/745 |
| | | | 303/3 |
| 2012/0168265 A1* | 7/2012 | Mahnkopf | B60T 8/447 |
| | | | 188/106 P |
| 2012/0198959 A1* | 8/2012 | Leiber | B60T 7/042 |
| | | | 74/514 |
| 2013/0060442 A1* | 3/2013 | Kaster | B60T 7/042 |
| | | | 701/99 |
| 2014/0214297 A1* | 7/2014 | Foitzik | B60T 8/171 |
| | | | 701/70 |
| 2018/0099649 A1* | 4/2018 | Kim | B60T 13/662 |
| 2018/0215272 A1* | 8/2018 | Vitullo | B60L 7/18 |
| 2019/0202426 A1* | 7/2019 | Baehrle-Miller | B60T 13/741 |
| 2019/0340850 A1* | 11/2019 | Chiron | H04W 4/80 |
| 2021/0162963 A1* | 6/2021 | Nemoto | B60W 10/026 |
| 2022/0169249 A1* | 6/2022 | Gaughan | B60T 17/22 |

* cited by examiner

METHOD FOR DETECTING A BRAKE PEDAL ACTUATION OF A BRAKE PEDAL BY A DRIVER DURING AN INITIALISATION OF AN ACTUATOR AND METHOD FOR INITIALISING AN ACTUATOR OF A BRAKE SYSTEM

CROSS-REFERENCE TO RELATED APPLICATION

This application claims priority to German Priority Application No. 102021128011.7, filed Oct. 27, 2021; the disclosure of which is incorporated herein by reference in its entirety.

TECHNICAL FIELD

The disclosure relates to a method for detecting a brake pedal actuation of a brake pedal by a driver during an initialization of an actuator of a brake system and a method for initializing an actuator of a brake system. The disclosure furthermore relates to a corresponding computer program product, control unit and a corresponding device.

BACKGROUND

During an initialization, for example a system initialization, of an actuator, such as a brake booster, of a brake system, a sensor-offset calibration often takes place in order to compensate system-related ageing and/or wear effects. To this end, it is vital to reliably detect whether the brake pedal is actuated or pre-actuated, for example in error, by a foot of the driver; i.e. whether or not, contrary to a normal brake request, a minimal pedal actuation, for example of only a few millimetres, takes place as a result of a foot of the driver resting on the pedal.

The driver is necessarily present for a sensor-offset calibration while the vehicle is moving. However, an implausible action cannot then be ruled out. This means that, although a vehicle is accelerating, it cannot be ruled out with certainty that a foot of the driver is not positioned on the brake pedal. This problem is known under the term "two-footed driver". There is therefore a risk of false calibrations, which may be relevant in terms of safety or at least in terms of comfort. There is therefore a need to significantly reduce the risk of false calibrations.

SUMMARY

The disclosure is based on functionally improving a method mentioned at the outset. Moreover, the disclosure is based structurally and/or functionally improving a computer program product mentioned at the outset and a control unit mentioned at the outset. The disclosure is furthermore based on structurally and/or functionally improving a device mentioned at the outset.

A method may be for detecting a brake pedal actuation of a brake pedal, for example as a result of an actuation by a driver of a motor vehicle, during an initialization of an actuator of a brake system. The actuation by the driver may take place, or may have taken place, in error or by mistake. The brake system may be for a motor vehicle. The motor vehicle may be a car or a lorry. The brake system may be a vehicle brake system and/or a motor vehicle brake system. The actuator may be an actuator device. The actuator may be a brake booster. The brake booster may be an electrical and/or electromechanical brake booster (electronic brake booster, EBB). The initialization may be a system initialization. The initialization may be and/or comprise a calibration, for example an offset calibration. The initialization may be and/or comprise a sensor calibration or a sensor-offset calibration. The initialization may be an initialization of the actuator and/or of the brake system. The initialization may be an initialization operation of the actuator and/or of the brake system.

In the method, during the initialization and/or an operation, in for example an initialization operation and/or a system initialization, of the actuator, a position analysis of a pedal position and/or of a pedal travel of the brake pedal and/or of an input piston, which is coupled and/or couplable to the brake pedal, may take place. The position analysis may be a dynamic position analysis. The operation or the initialization of the actuator may be triggered by a driver-independent and/or external request.

The actuator may comprise the input piston (input rod), The actuator may be designed to move, for example to displace and/or to shift, the input piston. The actuator may comprise an actuating element, such as a rack. The actuating element of the actuator may be designed to move, for example to displace and/or to shift, the input piston. The actuator may comprise a motor, such as an electric motor. The motor of the actuator may be designed to move, for example to displace and/or to shift, the actuating element, for example via a gear. The actuator may comprise a pedal travel sensor. The actuator may comprise a motor position sensor.

A pedal travel sensor signal may be received, for example continuously received. The pedal travel sensor signal may be recorded, for example continuously recorded, by the pedal travel sensor. The pedal position and/or the pedal travel may be established, for example continuously established, on the basis of the pedal travel sensor signal. The pedal position and/or the pedal travel may be a measured position of the pedal travel sensor.

A position and/or a travel, such as a displacement, of the actuating element, such as a rack, of the actuator and/or of a housing element (ratio housing), which is couplable and/or coupled to the actuating element, may be established, for example continuously. The housing element (ratio housing) may be designed for mounting the input piston, and in one exemplary arrangement, in a sliding manner. A motor position signal of the motor, such as an electric motor, of the actuator may be received, for example continuously received. The motor position signal may be recorded, for example continuously recorded, by the motor position sensor. The position and/or the travel of the actuating element of the actuator and/or of the housing element, which is couplable and/or coupled to the actuating element, may be established, for example continuously, on the basis of the motor position signal. The motor position signal may be a position signal of the actuating element of the actuator. The position and/or the travel of the actuating element of the actuator and/or of the housing element, which is couplable and/or coupled to the actuating element, may be a calculated and/or estimated position of the actuating element of the actuator and/or of the housing element.

The actuator, for example the motor thereof, may be controlled in such a way that the actuating element, such as a rack, of the actuator is displaced into a rear end position. The housing element, which is couplable and/or coupled to the actuating element, may thus also be displaced into a rear end position. The rear end position may be on a side which faces the brake pedal and/or a pedal unit. The rear end position may be defined and/or formed by a main housing, for example of the actuator, at least in part.

The actuator, for example the motor thereof, may be controlled in such a way that the actuating element, such as a rack, of the actuator is displaced from the rear end position in the direction of a front end position. The housing element, which is couplable and/or coupled to the actuating element, may thus also be displaced in the direction of a front end position, for example as soon as the actuating element comes into effective contact with the housing element and drags it along, depending on the design. The front end position may be on a side which faces away from the brake pedal and/or a pedal unit. The front end position may be defined and/or formed by the main housing, at least in part.

After overcoming a travel distance, such as a free travel distance, the brake pedal and/or the input piston, which is coupled and/or couplable to the brake pedal, may be displaced and/or dragged along in the direction of the front end position. This may take place for example by coupling the actuating element of the actuator, for example of the housing element which is coupled to the actuating element, to the brake pedal and/or input piston in a coupling position. In the coupling position, the travel distance or free travel distance may be overcome. The travel or free travel may be the travel from the rear end position to arriving at the coupling position.

At the point in time and/or from the point in time of the coupling, for example in the coupling position, of the actuating element and/or housing element to the brake pedal and/or input piston, an increasing pedal travel sensor signal may be recorded. The current pedal position and/or the current pedal travel may be established and/or stored as a start value, in one exemplary arrangement, a start position. For example, at the point in time of the coupling, for example in the coupling position, of the actuating element and/or housing element to the brake pedal and/or input piston, the current pedal position and/or the current pedal travel may be established and/or stored as a start value, in one exemplary arrangement, a start position. The point in time of the coupling may be a point in time at which the actuating element of the actuator and/or the housing element are in the coupling position.

The pedal travel sensor signal or the pedal position and/or the pedal travel may be compared to a first threshold value, for example continuously. In one exemplary arrangement, during the displacement of the actuating element of the actuator and/or of the housing element from the rear end position or from the coupling position in the direction of the front end position, the pedal travel sensor signal or the pedal position and/or the pedal travel may be compared to the first threshold value, for example continuously.

A difference between the pedal travel sensor signal or the pedal position and/or the pedal travel and the motor position signal or the position and/or the travel of the actuating element of the actuator and/or of the housing element may be determined, for example continuously. The difference may be compared to a second threshold value, for example continuously. In one exemplary arrangement, during the displacement of the actuating element of the actuator and/or of the housing element from the rear end position or from the coupling position in the direction of the front end position, the difference between the pedal travel sensor signal or the pedal position and/or the pedal travel and the motor position signal or the position and/or the travel of the actuating element of the actuator and/or of the housing element, may be determined, for example continuously, and/or the difference may be compared to the second threshold value, for example continuously.

The first threshold value and/or the second threshold value may be predefined or determined threshold values. The first threshold value and/or the second threshold value may be determined. The first threshold value and/or the second threshold value may be calibrated and/or calibratable threshold values. It may be determined whether the first threshold value and/or the second threshold value has/have been exceeded. If the first threshold value and/or the second threshold value has/have been exceeded, it may be detected that a brake pedal actuation of the brake pedal takes place as a result of the driver.

If the first threshold value has been exceeded, the motor of the actuator may be stopped. The actuating element of the actuator and the housing element may then be pushed back in the direction of the rear end position by a spring force, for example of a spring element. In this case, the motor of the actuator may be controlled in such a way that the coupling between the actuating element of the actuator and the housing element still exists. The contact or the coupling between the actuating element of the actuator and the housing element may be maintained in this way. In this case, a corresponding, for example constant, motor torque may be applied by means of the motor of the actuator. Upon reaching the rear end position, the current pedal position and/or the current travel value may be established and/or stored as an end value, for example an end position.

A difference between the start value, such as a start position, and the end value, such as an end position, may be determined. The difference may be compared to a third threshold value.

The third threshold value may be a predefined or determined threshold value. The third threshold value may be determined. The third threshold value may be a calibrated or calibratable threshold value. It may be determined whether the third threshold value has been exceeded. If the third threshold value has been exceeded, it may be detected that a brake pedal actuation of the brake pedal takes place as a result of the driver.

The travel or free travel, for example, the travel from the rear end position to arriving at the coupling position, may be recorded. The travel or free travel, for example, the travel from the rear end position to arriving at the coupling position, may be compared to a fourth threshold value. The fourth threshold value may be a predefined or determined threshold value. The fourth threshold value may be determined. The fourth threshold value may be a calibrated or calibratable threshold value. It may be determined whether the fourth threshold value has been exceeded. If the fourth threshold value has been exceeded, it may be detected that a brake pedal actuation of the brake pedal takes place as a result of the driver.

A method may be for initialization an actuator of a brake system of a motor vehicle. The brake system may be for a motor vehicle. The motor vehicle may be a car or a lorry. The brake system may be a vehicle brake system and/or a motor vehicle brake system. The actuator may be a brake booster. The brake booster may be an electrical and/or electromechanical brake booster (electronic brake booster, EBB). The initialization may be a system initialization. The initialization may be and/or comprise a calibration, for example an offset calibration. The initialization may be and/or comprise a sensor calibration or sensor-offset calibration. The initialization may be an initialization operation of the actuator and/or of the brake system. The actuator and/or the brake system may be designed as described above and/or below.

During the initialization and/or an initialization operation of the actuator, it may be detected whether or not a brake pedal actuation of a brake pedal takes place, for example as a result of an actuation by the driver of the motor vehicle. The actuation by the driver may take place, or may have taken place, in error or by mistake. The detection of the brake pedal actuation may take place according to the method, described above and/or below, for detecting a brake pedal actuation of a brake pedal by a driver during an initialization of an actuator.

If a brake pedal actuation was not detected, an offset calibration and/or offset correction of the pedal travel sensor signal or of the pedal position and/or of the pedal travel, and/or an offset calibration and/or offset correction of the motor position signal or of the position and/or of the travel of the actuating element of the actuator and/or of the housing element, may take place on the basis of currently recorded offset values.

If a brake pedal actuation was detected, an offset calibration and/or offset correction of the pedal travel sensor signal or of the pedal position and/or of the pedal travel, and/or an offset calibration and/or offset correction of the motor position signal or of the position and/or of the travel of the actuating element of the actuator and/or of the housing element, may take place on the basis of offset values recorded during a previous, for example successful, initialization.

The method for detecting a brake pedal actuation of a brake pedal by a driver during an initialization of an actuator, and/or for initializing an actuator of a brake system, may be stored as a computer program on a computer, microcomputer, in an electronic control and/or processing unit/device or on a storage medium, and/or implemented thereon/therein, at least in part. In terms of the software technology, the computer program may be split over one or more storage media, control and/or processing units/devices or computers, etc.

A computer program product may prompt a device to execute the method described above and/or below, for example for detecting a brake pedal actuation of a brake pedal by a driver during an initialization of an actuator and/or for initializing an actuator of a brake system. A computer program product may comprise program code in order to execute the method described above and/or below, for detecting a brake pedal actuation of a brake pedal by a driver, during an initialization of an actuator and/or for initializing an actuator of a brake system, when the computer program product is executed on a processor. A computer program product may prompt a device, such as a, for example electronic, control and/or control and/or processing unit/device, a control system, a driver assistance system, a brake system, such as a vehicle brake system, a processor or a computer; to execute the method described above and/or below, for detecting a brake pedal actuation of a brake pedal by a driver, during an initialization of an actuator and/or for initializing an actuator of a brake system. To this end, the computer program product may comprise corresponding data sets and/or program code and/or the computer program and/or a storage medium for storing the data sets or the program.

A control unit or a system comprising a plurality of control units may be used in a motor vehicle. The brake system may comprise the control unit or the system comprising a plurality of control units.

The control unit or the system may be designed and intended for use in a motor vehicle. The control unit or the system may comprise an electronic control. The control unit or the system may be or comprise an electronic control unit (ECU). A plurality of control units may be provided. The plurality of control units may be connected, and/or exchange data with one another, via a bus system, for example a controller area network (CAN). The electronic control and/or the control unit or system may comprise a microcomputer and/or processor. The control unit or system may comprise one or more sensors and/or be connected thereto. The control unit or system may comprise the computer program product described above and/or below. The control unit or system may comprise a memory. The computer program product may be stored in the memory. The control unit or system may be designed to implement the method described above and below, for example for detecting a brake pedal actuation of a brake pedal by a driver during an initialization of an actuator and/or for initializing an actuator of a brake system.

A device, such as a control unit and/or actuator/actuator device, and/or brake system may be designed and/or intended to implement the method described above and/or below, for detecting a brake pedal actuation of a brake pedal by a driver during an initialization of an actuator and/or for initializing an actuator of a brake system.

In other words, the detection of a brake actuation may be provided and/or implemented during an initialization of an actuator, such as an EBB system. As a result of a specific control of the EBB actuator (motor with position sensor, MPS), the brake pedal may be dragged along after overcoming a constructive free travel distance (pedal travel sensor, PTS). In the case of a non-actuated pedal, it may be expected that the PTS signal follows the MPS signal in a certain tolerance band and/or the free travel distances (no pedal drag) correspond to certain expected values. In the case of a pedal which is slightly actuated by a foot of the driver, the drag procedure may be disrupted and/or the PTS signal exits the expected tolerance band.

As discussed herein, an implausible action, for example if the brake pedal is actuated or pre-actuated by a foot of the driver, for example in error, may be reliably detected. Even a minimal pedal actuation of only a few millimetres as a result of a foot of the driver resting on the pedal may be reliably detected. An initialization and/or calibration, such as an offset calibration, may be optimally implemented. False calibrations may be prevented. The comfort and/or the safety may be increased.

BRIEF DESCRIPTION OF DRAWINGS

Exemplary arrangements of the disclosure are described in more detail below with reference to figures, in which, schematically and by way of example.

DETAILED DESCRIPTION

Figure 1:
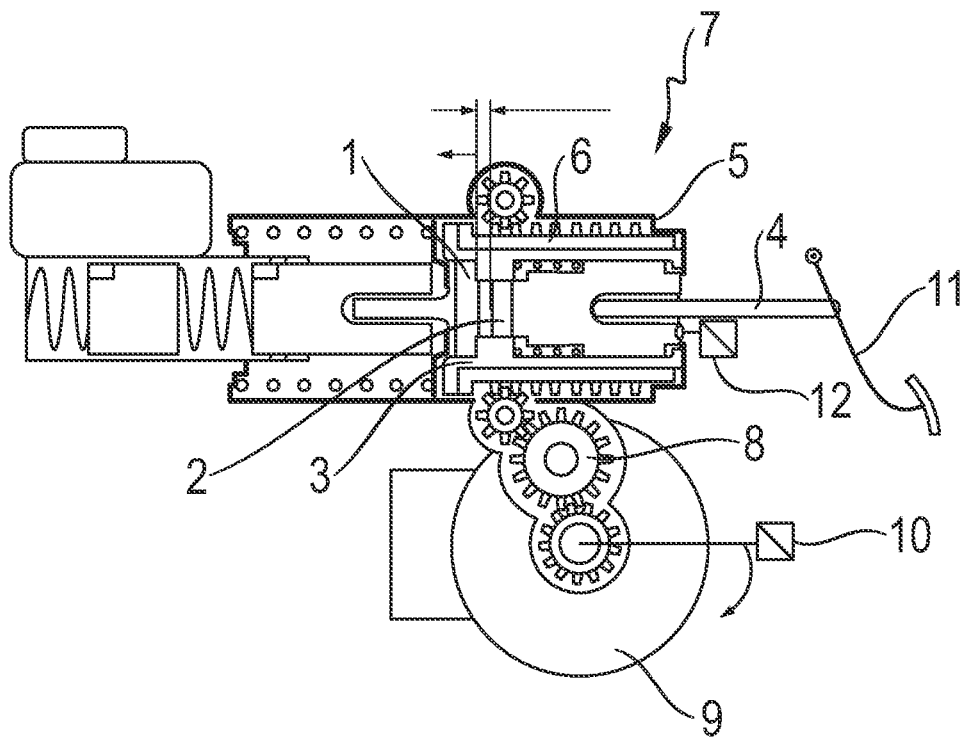
FIG. 1 shows the design of an actuator of a brake system.

FIG. 1 shows, in a schematic representation, an actuator 7 of a brake system, which actuator is designed as an electromechanical brake booster (EBB). The actuator 7 has a first transmission element 1 (reaction disc) and a second transmission element 2 (ratio disc). The actuator 7 furthermore has a main housing 5, in which a movable housing element 3 (ratio housing) is arranged. An input piston 4 (input rod) is displaceably mounted in the housing element 3.

The actuator 7 has an actuating element 6 (rack), which is coupled to the housing element 3. The actuating element can be driven by a motor 9, such as an electric motor, via a gear 8, so that the actuating element 6, together with the housing element 3, can be displaced between a rear end position (on the right in FIG. 1) and a front end position (on the left in FIG. 1).

A motor position sensor 10 (MPS) for recording a motor position signal is furthermore provided. The input piston 4 is coupled to a brake pedal 11 and equipped with a pedal travel sensor 12 for recording a pedal travel sensor signal.

To detect a brake pedal actuation of a brake pedal by a driver, a dynamic, position analysis of a pedal position and/or of a pedal travel of the brake pedal 11 or of the input piston 4, which is coupled to the brake pedal 11, takes place during an initialization or an initialization operation of the actuator 7, as is described in more detail below with reference to FIG. 2.

Figure 2:
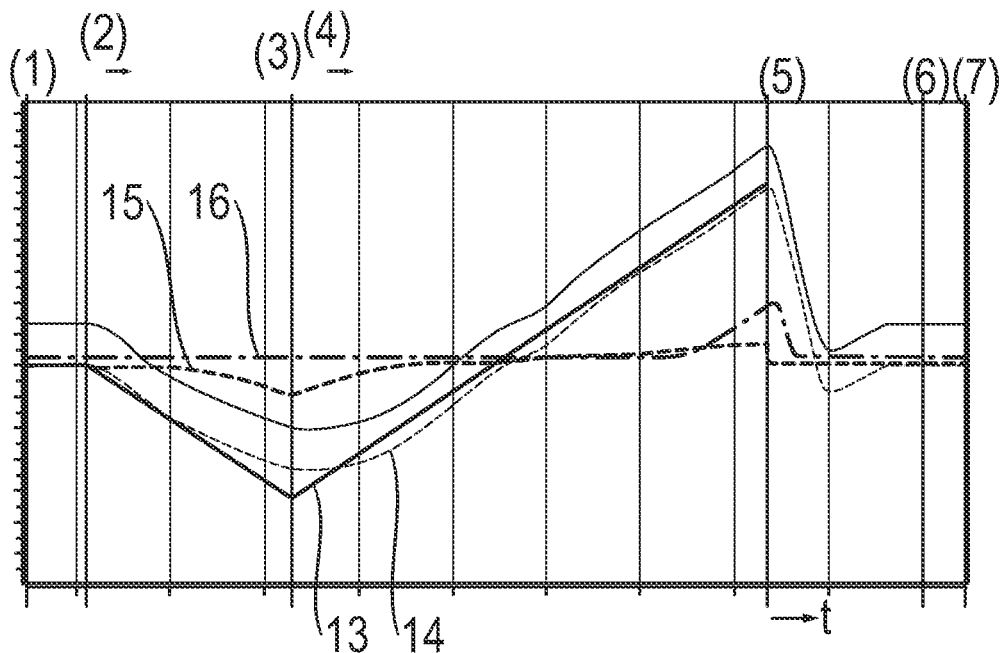
FIG. 2 shows a graph of the recorded signals during the detection of a brake pedal actuation and an initialization of the actuator.

FIG. 2 shows, in a schematic representation, a graph of the recorded signals during the detection of the brake pedal actuation and initialization of the actuator 7. A target position signal 13 of the actuating element 6 (rack target position), a recorded position signal 14 of the actuating element 6 (rack position), a motor torque signal 15 (motor torque) and a recorded pedal travel sensor signal 16 (PTS) are illustrated over the time curve t.

The pedal travel sensor signal 16 is continuously recorded by the pedal travel sensor 12, wherein the pedal position and/or the pedal travel is continuously established on the basis of the pedal travel sensor signal 16. The motor position signal of the motor 9 of the actuator 7 is furthermore continuously recorded by the motor position sensor 10, wherein the motor position signal defines the recorded position signal 14 of the actuating element 6 and therefore establishes a position and/or a travel, such as a displacement, of the actuating element 6 of the actuator 7.

At a point in time (2), the actuator 7 or the motor 9 thereof is controlled in such a way that the actuating element 6 of the actuator 7 is displaced into the rear end position (to the right in FIG. 1), until, at a point in time (3), it has arrived at the rear end position (rack at rear abutment/mechanical end stop). In FIG. 2, the points in time are shown by circles containing numbers, which are illustrated at the upper edge of the graph.

Then, from the point in time (3)/(4), the actuator 7 or the motor 9 thereof is controlled in such a way that the actuating element 6 of the actuator 7 is displaced from the rear end position in the direction of a front end position (on the left in FIG. 1). From a certain point in time or displacement, the housing element 3, which is couplable and/or coupled to the actuating element 6, may also be displaced in the direction of the front end position, for example as soon as the actuating element 6 comes into effective contact with the housing element 3 and drags it along, depending on the design (contact rack to ratio housing).

After overcoming a free travel distance, the brake pedal 11 or the input piston 4 which is coupled to the brake pedal 11 is displaced or, depending on the design, dragged along in the direction of the front end position. This takes place at a coupling time in a coupling position in which the actuating element 6 of the actuator 7 or the housing element 3, which is coupled to the actuating element 6, is coupled to the brake pedal 11 or the input piston 4 (first PTS movement). From this point in time, an increasing pedal travel sensor signal 16 is recorded. At this point in time, the current pedal position and/or the current pedal travel is furthermore established and/or stored as a start value, for example, a start position.

During the displacement of the actuating element 6 of the actuator 7 from the rear end position or from the coupling position in the direction of the front end position, the pedal travel sensor signal 16 is continuously compared to a first threshold value.

During the displacement from the rear end position in the direction of the front end position, a difference between the pedal travel sensor signal 16 and the motor position signal or position signal 14 of the actuating element 6 is furthermore continuously determined and continuously compared to a second threshold value. If the second threshold value has been exceeded, it is detected that a brake pedal actuation of the brake pedal takes place as a result of the driver.

If the first threshold value has been exceeded, at the point in time (5), the motor 9 of the actuator 7 is stopped and the actuating element 6 of the actuator 7 and the housing element 3 are pushed back in the direction of the rear end position by a spring force of a spring element, wherein the motor 9 of the actuator 7 is controlled in such a way that the coupling between the actuating element 6 of the actuator 7 and the housing element 3 still exists, as a result of providing a constant motor torque.

Upon reaching the rear end position, at the point in time (6), the current pedal position and/or the current pedal travel is established and/or stored as an end value, for example an end position. A difference between the start value and the end value is then determined and compared to a third threshold value. If the third threshold value has been exceeded, it is detected that a brake pedal actuation of the brake pedal takes place as a result of the driver.

Additionally or alternatively, the free travel may also be recorded and compared to a fourth threshold value, wherein it is detected that a brake pedal actuation of the brake pedal takes place as a result of the driver if the fourth threshold value has been exceeded.

On the basis of the detection of the brake pedal actuation, a method for initializing the actuator 7 may detect, during the initialization of the actuator 7, whether or not a brake pedal actuation of the brake pedal 11 takes place as a result of the driver.

In addition, please refer moreover to FIG. 1 and the associated description.

"May" denotes optional features of the disclosure. Consequently, there are also developments and/or exemplary arrangements of the disclosure which additionally or alternatively have the respective feature or the respective features.

Isolated features may also be extracted as required from the feature combinations disclosed in the present case and, by eliminating a structural and/or functional connection which is possibly present between the features, may be used in combination with other features to define the subject matter of a claim. The sequence and/or number of steps of the method may be varied. The methods may be combined with one another, for example to create an overall method.

The invention claimed is:

1. A method for detecting an unintended brake pedal actuation of a brake pedal by a driver during an initialization of an actuator of a brake system for performing a sensor-offset calibration, in which, during operation, of the actuator a position analysis of a pedal position and/or of a pedal travel of the brake pedal and/or of an input piston takes place, the method comprising: controlling the actuator to displace an actuating element from a rear end position toward a front end position, the rear end position proximal relative to the brake pedal and the front end position distal proximal relative to the brake pedal; establishing a start value of the pedal position when the actuating element couples with the brake pedal; comparing the pedal position to a first threshold value and a difference between the pedal position and an actuator position to a second threshold value; detecting the brake pedal actuation if either threshold value is exceeded; and selecting between current offset values or previously recorded offset values for the sensor-offset calibration based on whether the brake pedal actuation is detected.

2. The method according to claim 1, wherein a pedal travel sensor signal is received, and/or recorded by a pedal travel sensor, wherein the pedal position and/or the pedal travel is established on the basis of the pedal travel sensor signal.

3. The method according to claim 2, wherein a position of an actuating element, of the actuator is established.

4. The method according to claim 3, wherein a motor position signal of a motor of the actuator is received and/or recorded by a motor position sensor, wherein the position the actuating element of the actuator is established on the basis of the motor position signal.

5. The method according to claim 4, wherein the actuator, is controlled in such a way that the actuating element of the actuator is displaced into a rear end position.

6. The method according to claim 5, wherein the actuator is controlled in such a way that the actuating element is displaced from a rear end position in the direction of a front end position.

7. The method according to claim 6 wherein, after overcoming a travel distance the brake pedal and/or the input piston, which is coupled and/or couplable to the brake pedal, is displaced in the direction of the front end position, by coupling the actuating element of the actuator of a housing element which is coupled to the actuating element, to the brake pedal and/or input piston in a coupling position, wherein, at the point in time of the coupling, in the coupling position, of the actuating element and/or the housing element to the brake pedal and/or input piston, an increasing pedal travel sensor signal is recorded and/or the current pedal position and/or the current pedal travel is established and/or stored as a start value.

8. The method according to claim 7, wherein, if the first threshold value has been exceeded, the motor of the actuator is stopped and/or the actuating element of the actuator and the housing element are pushed back in the direction of the rear end position by a spring force wherein the motor of the actuator is controlled in such a way that the coupling between the actuating element of the actuator and the housing element still exists.

9. The method for initializing an actuator of a brake system of a motor vehicle, wherein, during the initialization of the actuator, it is detected whether or not a brake pedal actuation of a brake pedal takes place as a result of a driver, wherein the detection of the brake pedal actuation according to the method takes place according to claim 1.

10. The method according to claim 9, wherein, if a brake pedal actuation was not detected, an offset calibration and/or offset correction of the pedal travel sensor signal or of the pedal position and/or of the pedal travel, and/or an offset calibration and/or offset correction of the motor position signal or of the position and/or of the travel of the actuating element of the actuator and/or of the housing element, takes place on the basis of currently recorded offset values.

11. The method according to claim 10, wherein, if a brake pedal actuation was detected, an offset calibration and/or offset correction of the pedal travel sensor signal or of the pedal position and/or of the pedal travel, and/or an offset calibration and/or offset correction of the motor position signal or of the position and/or of the travel of the actuating element of the actuator and/or of the housing element, takes place on the basis of offset values recorded during a previous initialization.

12. A system comprising:
a memory configured to store computer-executable instructions;
a processor configured to execute the computer-executable instructions to cause the processor to:
detect an unintended brake pedal actuation of a brake pedal by a driver during an initialization of an actuator of a brake system, in which, during operation of the actuator, a dynamic position analysis of a pedal position and/or of a pedal travel of the brake pedal and/or of an input piston takes place by:
controlling the actuator to displace an actuating element from a rear end position toward a front end position, the rear end position proximal relative to the brake pedal and the front end position distal proximal relative to the brake pedal;
establishing a start value of the pedal position when the actuating element couples with the brake pedal;
comparing the pedal position to a first threshold value and a difference between the pedal position and an actuator position to a second threshold value;
detecting the brake pedal actuation if either threshold value is exceeded; and
selecting between current offset values or previously recorded offset values for the sensor-offset calibration based on whether the brake pedal actuation is detected.

13. A vehicle braking system comprising:
a memory configured to store computer-executable instructions;
a processor configured to execute the computer-executable instructions to cause the processor to:
detect an unintended brake pedal actuation of a brake pedal by a driver during an initialization of an actuator of a brake system, in which, during operation of the actuator, a dynamic position analysis of a pedal position and/or of a pedal travel of the brake pedal and/or of an input piston takes place by:
controlling the actuator to displace an actuating element from a rear end position toward a front end position, the rear end position proximal relative to the brake pedal and the front end position distal proximal relative to the brake pedal;
establishing a start value of the pedal position when the actuating element couples with the brake pedal;
comparing the pedal position to a first threshold value and a difference between the pedal position and an actuator position to a second threshold value;
detecting the brake pedal actuation if either threshold value is exceeded; and
selecting between current offset values or previously recorded offset values for the sensor-offset calibration based on whether the brake pedal actuation is detected.

* * * * *